(No Model.)
H. HABERLIN.
FRICTION CLUTCH.
No. 422,402. Patented Mar. 4, 1890.
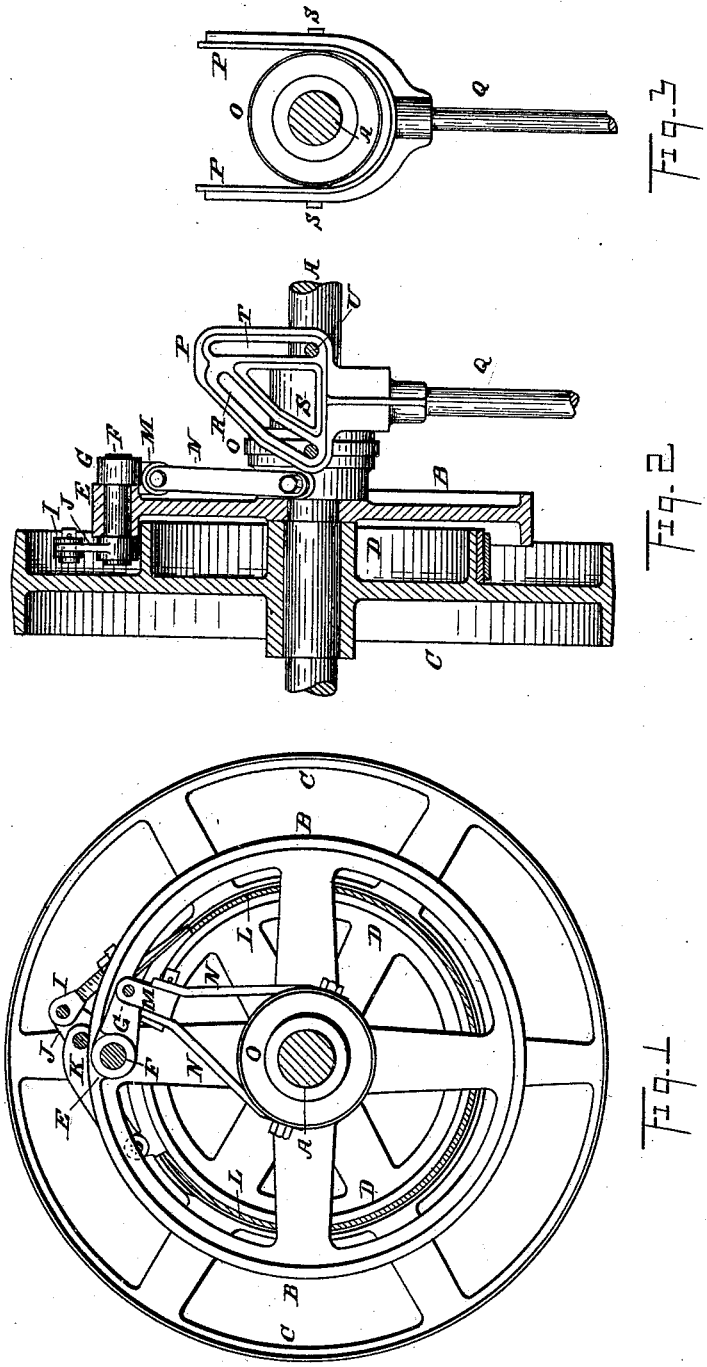
Witnesses.
Inventor
Herman Haberlin:
by C. P. Humphrey
Attorney.

UNITED STATES PATENT OFFICE.

HERMAN HABERLIN, OF AKRON, OHIO.

FRICTION-CLUTCH.

SPECIFICATION forming part of Letters Patent No. 422,402, dated March 4, 1890.

Application filed November 14, 1889. Serial No. 330,329. (No model.)

*To all whom it may concern:*

Be it known that I, HERMAN HABERLIN, a citizen of the United States, residing at Akron, in the county of Summit and State of Ohio, have invented a certain new and useful Improvement in Friction-Clutches, of which the following is a specification.

My invention has relation to improvements in that class of friction-clutches in which motion is communicated from a disk or wheel tightly mounted on a revolving shaft to a pulley or drum loosely mounted on said shaft by means of a driving-band attached to one of said parts and drawn against a pulley-face connected with the other part.

The objects of my invention are, first, to provide new and effective devices for tightening and releasing the driving-band; second, to furnish a new appliance for operating said devices, and, generally, to simplify the construction and reduce the number of parts.

To this end my invention consists of the peculiar construction and combination of parts hereinafter described, and then specifically pointed out in the claims, reference being had to the accompanying drawings, forming a part of this specification.

In the accompanying drawings, in which similar reference-letters indicate like parts, Figure 1 is an elevation, looking lengthwise of the shaft, of a friction-clutch embodying my invention, the collar-shifting device being omitted; Fig. 2, a transverse central section of the same with collar-shifting device, and Fig. 3 an elevation of the collar-shifting device.

In the drawings, A is the main shaft, B a wheel keyed or otherwise rigidly secured thereon, and C a pulley loosely mounted on said shaft adjacent to the wheel B and bearing on the side toward said wheel an annular flange D, which may be integral with said pulley C or separately constructed and attached thereto. At one side of the wheel B is formed a journal-bearing E, in which is a short shaft F, bearing on its inner end a crank-arm J and on its outer end a crank-arm G. About the annular flange D is a driving-band L, having its ends connected with the crank-arm J by the hinge-links I K, the former provided with a screw-threaded portion and nuts or a turn-buckle, by which the length of the driving-band may be adjusted.

The hinge-links I K are connected with the crank-arm J at different distances from its center, the former being farthest, so that as the shaft F is partially revolved they act simultaneously, the one to draw and the other to release the band, and as the link I travels the greater distance a differential effect is secured to tighten or release the band. To avoid confusion of lines, the connection of the hinge-link K with the crank-arm J is not shown in Fig. 2; but its relation thereto will be readily understood from Fig. 1.

It is obvious that two crank-arms of different lengths for the hinge-links I K may be substituted for the single arm J and accomplish the same end; but the form shown is preferred.

For operating this clutch mechanism there is mounted on the shaft A a sliding sleeve O, on opposite sides of which are pivoted connecting-rods N N, connected with the outer end of the crank-arm G by a universal joint M. The universal joint is employed instead of the ball-and-socket joint ordinarily used in clutches of this class, as causing less friction and affording more rigidity to the parts. By sliding the sleeve O away from the wheel B the outer end of the crank-arm G is drawn inward, thereby releasing the band L from the annular flange D, and by reversing the operation the band is clamped against said rim, whereby the pulley C is caused to revolve with the shaft A. For operating the sliding sleeve O a forked or bifurcated head P is used, which is mounted on a shaft Q, which is arranged to move in a line at a right angle with the shaft A. In this head are diagonal ways or slots R, in which pins S, projecting from each side of the sleeve O, slide, by which arrangement the sleeve is forced toward the wheel B as the head P approaches the shaft A and withdrawn as the head recedes. The angle of deflection of the guides R from the line of motion of the head A decreases as they depart therefrom, as the resistance of the sleeve increases as it approaches the wheel B.

To prevent any lateral motion of the head P as it is moved to and from the shaft A, I have shown slots T, which slide on pins U, the supports of which are not shown. This construction, however, is shown for the purpose of illustrating one form of guide; but this form is not essential to my invention, as any guide which will direct the head P in a line at a right angle to the shaft A may be employed.

Having thus described my invention, I claim—

1. In a clutch of the kind specified, the combination, with the main shaft, the loosely-mounted pulley having an annular flange, the rigidly-mounted wheel and rock-shaft journaled therein, having crank-arms at each end, and the driving-band connected with one of said crank-arms at different distances from its center, of the sliding sleeve mounted on said main shaft, and, for connecting said sleeve with the other crank-arm, the connecting-rods and universal joint, substantially as shown and described.

2. In a clutch of the kind specified, the combination, with the rock-shaft and the sliding sleeve united with said rock-shaft by the connecting-rod and universal joint and having side projections, of the bifurcated head arranged to move reciprocally at a right angle with the axis of the sliding sleeve and having ways diagonal to its line of motion to engage the projections of the sliding sleeve, substantially as shown and described.

In testimony that I claim the above I hereunto set my hand.

HERMAN HABERLIN.

In presence of—
C. P. HUMPHREY,
C. E. HUMPHREY.